United States Patent [19]

Blanton, Jr.

[11] 4,325,926

[45] Apr. 20, 1982

[54] PROCESS FOR REMOVING SULFUR DIOXIDE FROM A GAS

[75] Inventor: William A. Blanton, Jr., Woodacre, Calif.

[73] Assignee: Chevron Research Company, San Francisco, Calif.

[21] Appl. No.: 137,940

[22] Filed: Apr. 7, 1980

Related U.S. Application Data

[63] Continuation-in-part of Ser. No. 18,083, Mar. 6, 1979, abandoned, which is a continuation-in-part of Ser. No. 2,054, Jan. 8, 1979, abandoned, which is a continuation of Ser. No. 861,461, Dec. 16, 1977, abandoned.

[51] Int. Cl.³ .................. B01J 8/00; C01B 17/78; B01J 27/14; B01J 23/16
[52] U.S. Cl. .................. 423/244; 423/535; 252/435; 252/464
[58] Field of Search ............ 423/244 R, 244 A, 535; 252/435, 464

[56] References Cited

U.S. PATENT DOCUMENTS

| | | | |
|---|---|---|---|
| 1,887,978 | 11/1932 | Joseph | 423/535 |
| 2,046,166 | 6/1936 | Jenks | 423/535 |
| 3,186,794 | 6/1965 | Davis | 423/535 |
| 3,282,645 | 11/1966 | Mandelik | 423/535 |
| 3,300,280 | 1/1967 | Terminet | 423/535 |
| 3,454,356 | 6/1969 | Raman | 423/242 |
| 3,501,897 | 3/1970 | Van Helden | 423/244 |
| 3,615,196 | 10/1971 | Welty, Jr. | 423/242 |
| 3,739,550 | 6/1973 | Martin et al. | 423/244 |
| 3,816,597 | 1/1974 | Smith | 423/244 |
| 3,989,798 | 11/1976 | Greene et al. | 423/244 |

FOREIGN PATENT DOCUMENTS

| 432495 | 9/1974 | U.S.S.R. | 423/535 |
|---|---|---|---|
| 525470 | 8/1976 | U.S.S.R. | 423/535 |

OTHER PUBLICATIONS

Jiru et al., Stabilized Vanadium Oxide Catalysts for the Production of Sulfuric Acid, International Chemical Engineering, vol. 20 #4, Oct. 1962, pp. 531–536.

Gerburt et al., Preparation of Catalysts for the Oxidation of Sulfur Dioxide at Lower Ignition Temperatures, from Vanadium Catalysts for Catalytic Production of Sulfuric Acid, V. V. Illarinor et al., Editor, Goskimizpat, Moscow, 1963, pp. 36–42.

*Primary Examiner*—Gary P. Straub
*Attorney, Agent, or Firm*—D. A. Newell; S. R. LaPaglia; C. L. Hartman

[57] ABSTRACT

A waste gas containing sulfur dioxide is desulfurized by contacting the gas with phosphorus-promoted sodium vanadate disposed upon porous alumina having a phosphorus-to-vanadium atomic ratio in the range 0.2–1.8 to 1.

5 Claims, 2 Drawing Figures

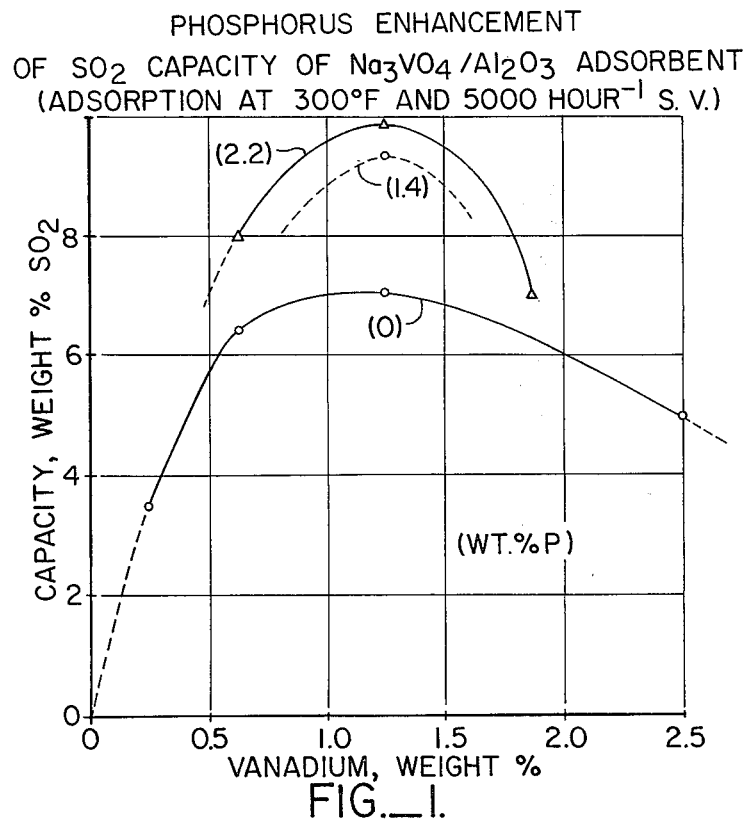
FIG._1.
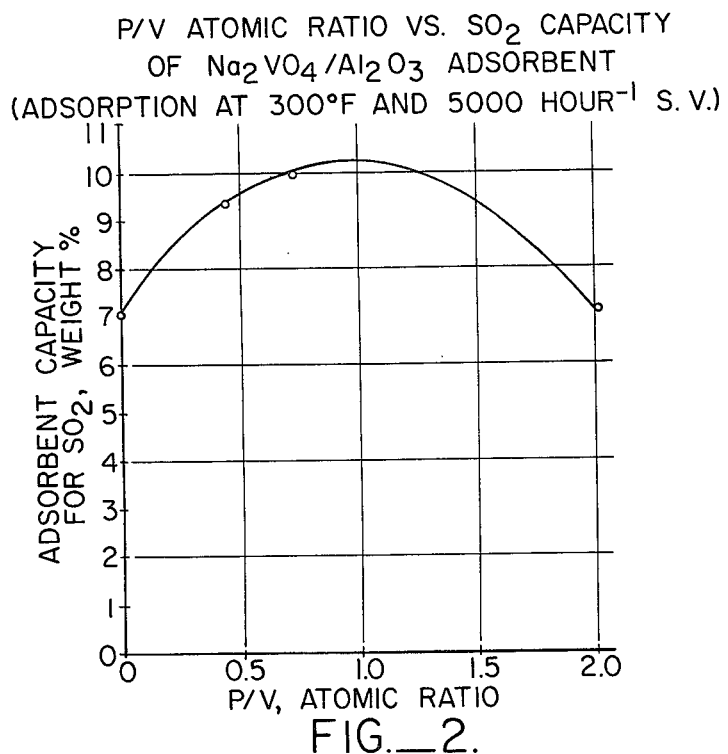
FIG._2.

PROCESS FOR REMOVING SULFUR DIOXIDE FROM A GAS

RELATED APPLICATIONS

This application is a continuation-in-part of copending application Ser. No. 18,083, filed on Mar. 6, 1979 now abandoned, which is a continuation-in-part of my copending application Ser. No. 2,054 filed Jan. 8, 1979, now abandoned, which in turn is a continuation of application Ser. No. 861,461, filed Dec. 16, 1977 now abandoned.

BACKGROUND OF THE INVENTION

This invention relates to an improved process for desulfurization of a waste gas containing sulfur dioxide. More particularly, it relates to a process for removing sulfur dioxide from a flue gas using a solid phosphorus-promoted sodium vanadate adsorbent.

Sulfur dioxide is known to be an undesirable atmospheric pollutant. It is known in the process art to adsorb sulfur dioxide from a waste gas by contacting the gas with a solid adsorbent, such as a porous alumina carrier having disposed thereon alkali metal oxide and vanadium oxide components (that is, alkali metal salts of oxyacids of vanadium) (see for example, representative U.S. Pat. Nos. 3,501,897 and 3,816,597). However, such adsorbents are not ideal, since their adsorption capacities are just moderate. Accordingly, there is a need for a means to enhance the sulfur dioxide capacity of such adsorbents.

My copending application Ser. No. 919,207, filed on June 26, 1978, my U.S. Pat. No. 4,239,742 issued Dec. 16, 1980, discloses a method for forming concentrated hydrogen sulfide from dilute sulfur dioxide in gases by adsorbing the sulfur dioxide with an adsorbent containing sodium, vanadium and alumina, converting the sulfur to sulfide form with carbon monoxide, and forming hydrogen sulfide by contacting the adsorbent with steam. The disclosure of Ser. No. 919,207 is incorporated herein by specific reference.

SUMMARY OF THE INVENTION

The present invention provides a method for removing sulfur dioxide from a gas by contacting the gas, at sulfur dioxide-absorbing conditions with an adsorbent composition consisting essentially of alumina, sodium vanadate and phosphate or sodium phosphovanadate or mixtures thereof in which the composition, based by weight upon the alumina and calculated as vanadium, contains an amount of the vanadate in the range of from about 1 to 10% and has a phosphorus-to-vanadium atomic ratio in the range of from about 0.2–1.8 to 1.

The term "sulfur-dioxide-absorbing conditions" as used herein means gas adsorbing conditions ordinarily employed using a solid alkali metal-alumina adsorbent, that is, including a gas-solid contact temperature in the range of from about 125° to 345° C., an hourly space velocity, volume of gas (STP) per volume of solid adsorbent, in the range of from about 500 to 20,000 V/V per hour, and adsorbent particles sized for fixed- or fluid-bed usage as ordinarily appropriate for the bed of choice.

Gaseous mixtures such as stack gases, flue gases and the like which contain sulfur dioxide are suitable for treatment by the present method. For economic operation, advantageous results are usually achieved when the gas contains a relatively low concentration of sulfur dioxide, preferably less than about 5 volume percent sulfur oxide. Best results are typically obtained in treating gases in which the sulfur dioxide content is in the range normally encountered in a flue gas, for example as produced in combusting a fossil fuel. Other representative gases which can suitably be treated include such waste gases as those produced in ore-roasting furnaces, ore smelting plants, waste gases from chemical plants and petroleum refineries, tail gases from sulfuric acid plants, Claus plants and the like sulfur dioxide-containing off gases. These gases may, and often do, also contain minor amounts of sulfur trioxide, oxygen gas, so-called acid gases other than sulfur dioxide and the like.

The adsorbent used in the present method is a porous composite of alumina, sodium vanadate and sodium phosphate. It may also contain a minor amount of at least one refractory oxide selected from the oxides of the metals of Groups II, IV, and of the other metals of Group III as support material.

The amount of vanadium which must be present in the composite for effective sulfur dioxide adsorption varies, depending upon the porosity of the composition and, based by weight upon the alumina, or alumina plus other refractory oxide, is, in general, in the range of from about 1 to 20, preferably 1 to 11 and more preferably 2 to 9%.

The amount of phosphorus which must be present in the composite for effective enhancement of its capacity for sulfur dioxide adsorption must be sufficient to provide a phosphorus-to-vanadium atomic ratio in the range of from about 0.2–1.8 to 1, preferably 0.5–1.5 to 1, and more preferably about 1 to 1.

The advantageous effect of phosphorus as a promoter and/or enhancer of the sulfur dioxide capacity of the adsorbent used in the present invention is shown in the curves in FIG. 1, wherein adsorption results obtained with a conventional sodium vanadate adsorbent (contains no phosphorus promoter) are compared with results obtained with adsorbents containing 1.4 or 2.2 weight percent (calculated as phosphorus and based by weight upon the porous alumina carrier) of phosphorus in adsorbing sulfur dioxide from a simulated flue gas (6% $H_2O$, 0.2% $SO_2$, 15% $CO_2$, 2% $O_2$ in nitrogen) under the conditions shown. The capacities were measured at the time when the effluent gas had a sulfur dioxide content equal to 25% of that of the feed gas. The curves of FIG. 1 demonstrate that inclusion of phosphorus in an adsorbent results in almost a 30% enhancement of the capacity of a sodium vanadate-containing adsorbent for sulfur dioxide adsorption.

FIG. 2 shows the effect of the phosphorus-to-vanadium atomic ratio in the adsorbents used in the present invention on sulfur dioxide adsorption capacity. The optimum is a 1 to 1 ratio. This suggests that sodium phosphovanadate or a 1 to 1 molecular complex of sodium vanadate and sodium phosphate may be functionally significant in the adsorption of sulfur dioxide.

The adsorbent composition employed may be prepared by any suitable method, for example by impregnating, drying and calcining a preformed carrier using an aqueous solution of sodium vanadate and phosphate. In another method, the salts as an aqueous concentrate may be added to peptized alumina in the form of a paste. After thorough mixing, the resulting paste is extruded, dried and calcined. Alumina and substantially (at least a major portion by weight) alumina carriers are commercially available. Therefore, preparation of the adsorbent composition by impregnation of a suitable carier is a preferred method. Silica per se is not a satisfactory carrier or component of the adsorbent composition, although the presence of a minor amount of silica in the adsorbent does not seem to be undesirable.

The adsorbent composition must be porous, for example having a pore volume in the range of from about 0.2 to 1, preferably 0.3 to 0.8, cc per gram. Alumina and silica-alumina composites having pore volumes in these ranges are commercially available or may be readily prepared by known methods.

Preferred carriers are those in which at least a major portion of the pore volume is contributed by micropores sized in the diameter range below about 250 Angstroms, especially in the range of from about 40 to 200 Angstroms, and in which a minor portion, preferably in the range of from about 3 to 15%, percent, of the pore volume is contributed by macropores sized in the diameter range of from about 0.1 to 15, preferably 0.1 to 5, microns. Macropores provide improved access channels in the adsorbent for the feed gas and minimize and/or for practical purposes eliminate diffusion problems. Carriers having the aforementioned characteristics are known and used in the catalyst art, are commercially available and are contemplated for use herein. An especially desirable carrier containing macro- and micropores and a method for its preparation is described in U.S. Pat. No. 4,102,822, B. F. Mulaskey.

The amount of sodium vanadate which the adsorbent should contain for effective adsorption of sulfur dioxide from waste gases depends primarily on the porosity or surface area of the carrier material. For the alumina carrier used for the examples of FIG. 1, this amount is in the range 2 to 8%, with the optimum at about 5 weight percent. In general, based upon the weight of the carrier or refractory oxide component and calculated as vanadium, the adsorbent should contain an amount of sodium vanadate in the range of from about 2 to 20, preferably 3 to 10%, with larger amounts being required as the porosity or surface area is increased.

The amount of sodium phosphate required to effect an appreciable enhancement of the capacity for sulfur dioxide adsorption for the adsorbent composition depends upon the amount of sodium vanadate therein. Referring to FIG. 2, it is evident that for the particular adsorbent used, even at a phosphorus-to-vanadium atomic ratio of 0.1, there is an appreciable adsorption enhancement, at a ratio of about 1 there is an optimum, and above about 2, there is none. For effective enhancement of adsorption, this ratio must be in the range of from about 0.2 to 1.8, preferably 0.5 to 1.5, and most preferably about 1.

The amount of the salts required for a satisfactorily enhanced adsorber varies, depending upon the particular carrier employed. In general, based upon the weight of the carrier component and calculated as vanadium, at least an appreciable (10 weight percent) enhancement of the sulfur dioxide capacity is achieved when the composite contains (1) an amount of vanadium in the range of from about 0.5 to 15%, preferably 1 to 10% and more preferably 2 to 8%, and (2) an amount of the phosphate sufficient to provide, as set forth above, a suitable atomic ratio of phosphorus to vanadium.

EMBODIMENT OF THE INVENTION

In a preferred embodiment of the invention, an adsorbent is prepared using a commercially available calcined alumina having (1) a pore volume in the range 0.4 to 0.6 cc per gram of which at least about 50% thereof is contributed by pores having diameters in the 80 to 150 Angstrom range and (2) a surface area in the range of from about 100 to 150 m$^2$/g. This carrier is impregnated with an aqueous solution obtained by dissolving sufficient sodium ortho-vanadate and trisodium phosphate to provide therein an atomic ratio of vanadium to phosphorus of about 1 and a concentration sufficient upon the impregnation or imbibation of the resulting salt solution by the alumina to provide a dried composite containing, calculated as vanadium and based upon the alumina, about 5 weight percent of vanadium. After preliminary drying of the impregnated alumina at a temperature of about 150° C. for a period sufficient to remove solvent water and loosely chemically bound water, the dried composite is heated in air, nitrogen or the like, at about 480° C. until little or no weight loss results from additional heating. The resulting adsorbent has a sulfur dioxide absorbing capacity at 150° C., based upon the weight thereof, which is at least 35% greater than the absorption of a comparable carrier free of phosphorus. This adsorbent exhibits excellent stability in use in a cyclic process including steps of adsorption and regeneration.

According to the invention, the above-described composite is used for removing sulfur dioxide from a flue gas resulting from combusting a fossil fuel, for example, coal and/or fuel oil. Such a gas ordinarily contains by volume an amount of sulfur dioxide of about 0.05 to about 0.3%. An especial advantage of using the present adsorbent is that it is effective in adsorbing sulfur dioxide at a relatively low temperature, for example as low as 150° C. Therefore, use of the present adsorbent in the process permits effective use of the heat generated from the burning of fossil fuel.

In a particularly preferred embodiment, the adsorbent, in a fixed bed, is contacted with the flue gas at a space velocity of about 8000 V/V/Hr and at a temperature of about 150° C. The contacting is continued until there results a predetermined break-through concentration of sulfur dioxide in the treated effluent gas stream, for example about 0.05 volume percent. The untreated feed gas is then processed in a second (switch) contact zone and the spent adsorbent in the first zone is regenerated. The adsorbent may be regenerated according to the process disclosed in my copending application Ser. No. 919,207 U.S. Pat. No. 4,239,742. In this procedure, briefly, the spent adsorbent may be heated to about 480° C. and, while maintaining this temperature, a dry reducing gas containing carbon monoxide is introduced into contact therewith. The contacting is continued until the resulting effluent gas stream contains an appreciable amount (for example, about 0.2 volume percent) of carbon monoxide. The introduction of the reducing gas stream is then stopped and the regeneration is completed by cooling and steaming the thus-treated adsorbent. Even at a contact temperature as low as 150° C., the steaming results in a very rapid evolution of hydrogen sulfide gas. The use of a dry carbon monoxide-containing reducing gas stream for the regeneration is especially advantageous. The effluent gas during the reduction step contains little or no sulfur oxides or sulfide and may be flared or incinerated without undesirable pollution effects. Then, by steaming in a subsequent step, an effluent stream rich in hydrogen sulfide and free of carbon monoxide is produced. This stream is an especially useful feed to a Claus unit or sulfuric acid plant. Another advantage in the regeneration procedure of Ser. No. 919,207, summarized above, is that the temperature of the regenerated adsorbent is conveniently adjusted during the regeneration to the temperature desired for the sulfur dioxide adsorption stage of the present invention.

ILLUSTRATIVE EMBODIMENT

In a preferred method for making the adsorbent used in the present invention, the composition is prepared using a commercially available alumina carrier having a pore volume of about 0.6 cc/gram. The carrier is impregnated with an aqueous solution in which trisodium phosphate and sodium ortho-vanadate or precursors thereof (for example phosphoric pentoxide, vanadium pentoxide, and sodium hydroxide) and admixed in the relative atomic proportions prescribed above. The resulting impregnated carrier is then dried to remove solvent and loosely bound water and calcined to constant weight using ordinary means including (1) drying by heating the impregnated carrier at a temperature in the range of from about 100° to 260° C. and higher, and (2) maintaining said dried composite at a temperature in the range of from about 260° C. to 925° C. and higher. Optionally as desired, the drying and calcining may be effected while passing a stream of a suitable carrier gas, for example air, nitrogen, and the like through a bed of the adsorbent in particulate form, for example particles sized in the usual average diameter range of 0.38 to 0.64 cm normally employed for fixed-bed operations.

Sulfur Dioxide Adsorption Conditions

The conditions satisfactory for use in the method of the invention are those ordinarily employed in flue gas treating, that is, including (1) a contact temperature basically in the range of from about 93° to 345° C., and (2) a space velocity, volume of gas at STP per volume of adsorbent per hour, in the range of from about 500 to 20,000. Preferred conditions for use in the method of the invention include (1) a temperature in the range of from about 120° to 315° C., more preferably 135° to 260° C., and (2) a space velocity in the range of from 1500 to 20,000 V/V/Hr, more preferably 2000 to 10,000 V/V/Hr.

Regeneration of Spent Adsorbent

The adsorbent of the invention is readily regenerated, after being spent through use in removing sulfur dioxide from a gas stream, by contacting the spent adsorbent under absorbent regenerating conditions, that is, by contact with a reducing gas, for example a hydrogen-, carbon monoxide-, and/or hydrocarbon-containing gas, a liquid hydrocarbon stream, a mixture of liquid oil, vaporized hydrocarbons and/or the like, the contacting being under reducing conditions normally employed in the art in reducing a conventional alkali metal vanadate adsorbent for sulfur dioxide, see for example U.S. Pat. No. 3,816,597 (W. M. Smith) and U.S. Pat. No. 3,501,897 (H. J. A. Van Helden et al), including (1) a temperature in the range of from about 260° to 870° C., preferably 370° to 538° C.; and (2) contacting of the reducing gas with the spent or partially spent adsorbent for a period sufficient for the desired regeneration, for example in the range of from about 0.1 to 24 hours.

EXAMPLES 1-10

In the following examples, the carrier was a porous alumina having (1) a surface area of about 200 m²/g; (2) a pore volume of about 0.6 cc/g of which about 75% of the pore volume was provided by pores in the 80 to 150 Angstrom diameter range; and (3) a 24 to 42 mesh particle size. In each example except where stated otherwise in the footnotes, the absorbent was prepared by the impregnation method using concentration of aqueous sodium ortho-vanadate or a mixture of sodium ortho-vanadate and trisodium phosphate required to provide a composite adsorbent having the indicated levels of vanadium and phosphorus. In each case, the wet or impregnated carrier was dried by maintaining it at 150° C. and finally any remaining volatiles were removed by maintaining the dried adsorbent at 482° C. in a stream of nitrogen gas until, for practical purposes, constant weight was reached.

In a standard test, each adsorbent, in a fixed bed, was subjected to alternate adsorbing and regenerating cycles until its capacity (defined as $SO_2$-loading when the effluent stream reached a sulfur dioxide content of 0.05 volume percent) had leveled out.

In the adsorbing cycle of the test, the sulfur-dioxide-containing gas used had the following composition:

| Component | %, Volume |
|---|---|
| $SO_2$ | 0.2 |
| $CO_2$ | 15 |
| $O_2$ | 2 |
| $H_2O$ | 6 |
| $N_2$ | Balance |

The conditions for the adsorbing cycle included a temperature of 150° C., and a space velocity of 5000 $V/V/Hr^{-1}$.

In the regenerating cycle, the spent bed was maintained at 482° C. and a regenerating gas consisting of 20 volumes of 3-heptene and 80 volumes of nitrogen gas was passed through the bed for 4 minutes followed by a purge stream consisting of 6 volumes of water vapor and 94 volumes of nitrogen gas for a period of 20 minutes.

The results are listed in the Table below.

TABLE

| Ex. No. | Vanadium, Wt. % | Added Component Kind | Added Component Wt. % | Capacity, Wt. % $SO_2$ |
|---|---|---|---|---|
| 1 | 2.5 | None | — | 6.4 |
| 2 | 5 | None | — | 7.1 |
| 3 | 5 | P | 1.1 | 9.5 |
| 4 | 5 | P | 2.2 | 9.9 |
| 5 | 5 | P(1) | 2.0 | 3.3 |
| 6 | 5 | P(1) | 1.0 | 4.5 |
| 7 | 5 | P(2) | 2.0 | 1.1 |
| 8 | 5 | P(3) | 1.5 | 9.3 |
| 9 | 5 | P(4) | 1.5 | 9.6 |
| 10 | 5(5) | None | — | 4.4 |

(1)Phosphorus added first as $H_3PO_4$ followed by calcining. Then $Na_2SO_4$ and $VOSO_4$ added, respectively, followed by drying and calcining.
(2)Sodium and vanadium added first as $Na_2SO_4$ and $VOSO_4$, respectively, followed by calcination; then phosphorus as $H_3PO_4$, followed by drying and calcining.
(3)Phosphorus added first as $Na_3PO_4$, followed by calcination prior to addition of vanadium as $Na_3VO_4$, followed by drying and calcining.
(4)Vanadium added as $Na_3VO_4$, followed by drying and calcining. Then phosphorus as $Na_3PO_4$ added, followed by drying and calcining.
(5)Sodium and vanadium added as $Na_2SO_4$ and $VOSO_4$, respectively, followed by drying and calcining.

In terms of sulfur dioxide capacity of the adsorbent, these examples demonstrate:

(1) The order of addition or simultaneous addition of sodium vanadate and phosphate to a carrier is not particularly important (compare Examples 3, 8 and 9);

(2) The presence of phosphate promoter materially improves the sulfur dioxide capacity of the adsorbent (compare Examples 2, 3, 4, 8 and 9); and (3) Vanadium(4) ($VO^{+2}$) is markedly inferior to vanadium(5) ($VO_4^{-3}$) (compare Examples 2 and 10).

What is claimed is:

1. A method for removing sulfur dioxide from a waste gas which consists essentially of contacting said waste gas, at sulfur dioxide absorbing conditions, with a composition consisting essentially of alumina, sodium vanadate and phosphate or sodium phosphovanadate or a mixture thereof, said composition, based on said alumina, containing an amount of said vandate, calculated as vanadium, in the range of from about 1 to 20%, and sufficient of said phosphate to provide a phosphorus-to-vanadium atomic ratio in the range of from about 0.2–1.8 to 1.

2. A method according to claim 1 wherein said alumina has a pore volume in the range of from about 0.2 to 1 cc/gram.

3. A method according to claim 2 wherein a major portion of said pore volume is contributed by pores sized in the diameter range below 250 Angstroms.

4. A method according to claim 3 wherein a minor portion of said pore volume is contributed by pores sized in the average diameter range of from about 0.1 to 15 microns.

5. A method according to claim 1 wherein said composition is formed by impregnating said sodium vanadate and phosphate or sodium phosphovanadate onto said alumina.

* * * * *